United States Patent [19]

Harper

[11] Patent Number: 4,836,783
[45] Date of Patent: Jun. 6, 1989

[54] ACTIVITY KIT

[76] Inventor: Cliff Harper, 327 Cantrell Place, S.W., Calgary, Alberta, Canada

[21] Appl. No.: 126,467

[22] Filed: Nov. 30, 1987

[51] Int. Cl.⁴ ............................................. G09B 11/04
[52] U.S. Cl. ...................... 434/87; 226/129; 434/88; 434/95; 434/426; 434/429
[58] Field of Search ............... 434/87, 81, 84, 85, 434/88, 89, 95, 426, 429; 226/129

[56] References Cited

U.S. PATENT DOCUMENTS

| | | | |
|---|---|---|---|
| 2,457,807 | 1/1949 | Davidson et al. | 226/129 X |
| 3,266,338 | 8/1966 | Layton et al. | 226/129 X |
| 3,768,177 | 10/1973 | Thomas | 434/159 X |
| 4,306,868 | 12/1981 | Hankins | 434/85 |
| 4,600,393 | 7/1986 | Rosenwinkel et al. | 434/88 |
| 4,604,062 | 8/1986 | Woods | 434/88 |

FOREIGN PATENT DOCUMENTS 363667 1/1937 Canada .

Primary Examiner—William H. Grieb
Attorney, Agent, or Firm—Berman, Aisenberg & Platt

[57] ABSTRACT

An activity kit for drawing, painting, sewing or the like, comprising a rigid case providing a flat activity surface and a cavity within the case for receiving a roll of medium, such as paper on which the activity is to be carried out. Medium from the roll is fed between medium guide positioned on the activity surface adjacent in the direction of dispensing of the medium. A medium dispensing control may be provided to restrict the medium which can be pulled at one time to only so much as would cover the activity surface. The kit according to the present invention provides a portable, compact activity center for young children in which the wastage of medium, such as drawing paper may be minimized through use of the medium dispensing control.

19 Claims, 3 Drawing Sheets

ACTIVITY KIT

This invention relates to activity kits and more particularly to kits for drawing and other activities having both educational and amusement potential, especially for children.

BACKGROUND OF THE INVENTION

There are numerous prior art drawing kits intended to provide instruction or entertainment for children or adults. The inventions described and illustrated in U.S. Pat. No. 3,768,177 of Thomas issued Oct. 30, 1973 and Canadian Pat. No. 363,667 of Morrison issued Jan. 26, 1937, are representative of such kits. In both cases, a sheet of paper is mounted on an activity area on a writing surface of a case, and an appropriate activity such as sketching or the like is carried out on the sheet.

It is an object of the present invention to provide a novel construction of a kit for drawing and other activities for children and others, which is both portable and easy to operate. It is a further object of the present invention to provide such a device in which the activity medium, for example paper, is not easily wasted.

SUMMARY OF THE INVENTION

In accordance with the present invention there is provided an activity kit which comprises a rigid case. The case has sides circumscribing an upper surface and a lower surface. The upper surface provides a flat activity surface. A cavity within the case receives a roll of medium, such as paper or cloth on which children can work. An elongated slot is provided in the upper surface. The slot communicates with the cavity through which slot medium from the roll is to be dispensed onto the activity surface. The length of the slot is sufficient to permit unobstructed dispensing of medium from the roll through it. Medium guide means are positioned on the upper surface adjacent the slot at the ends thereof and extend normal thereto in the direction of dispensing of the medium to guide and oposition medium from the slot over the activity surface.

In a preferred embodiment, the device is provided with a dispensing control means to restrict the amount of medium which can be normally dispensed at one time to only so much as would cover the activity surface.

The kit in accordance with the present invention is particularly effective for use by small children learning to draw and write. Because the medium such as drawing paper is in roll form and dispensed from a cavity beneath the drawing surface, wastage of paper is made significantly more difficult than would be the case with, for example a pad of paper. The kit arrangement according to the present invention lends itself readily to use by children on trips, for example in airplanes or in cars, providing an activity surface within a portable case. As well, the device may be easily modified or adapted to various art forms, such as sewing, needlecraft, pen and pencils, crayons, stencils, paints and the like.

BRIEF DESCRIPTION OF THE DRAWINGS

These and other objects and advantages of the invention will become apparent upon reading the following detailed description and upon referring to the drawings in which.

Figure 1:
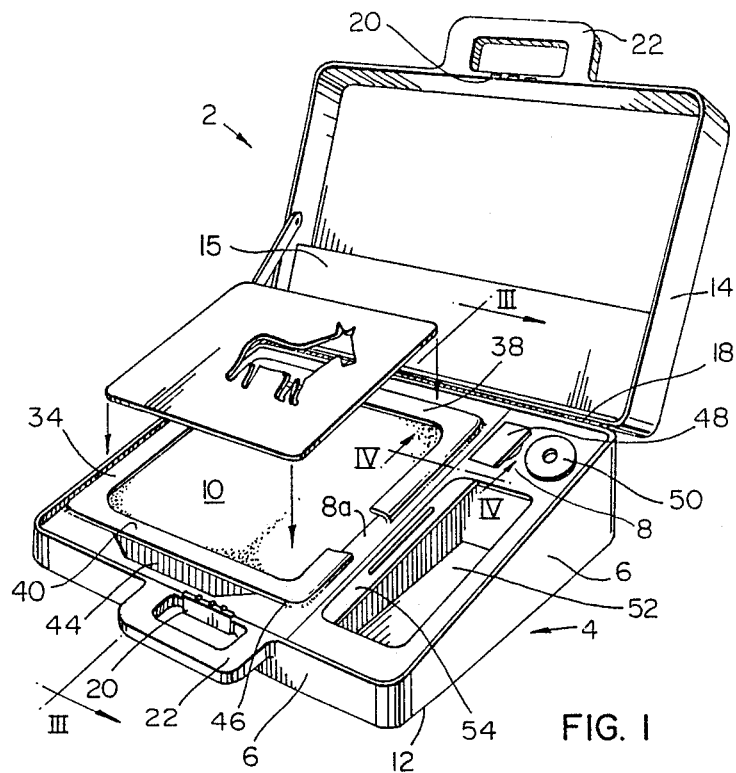
FIG. 1 is a perspective view of a drawing kit for children in accordance with the present invention, with its cover open.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
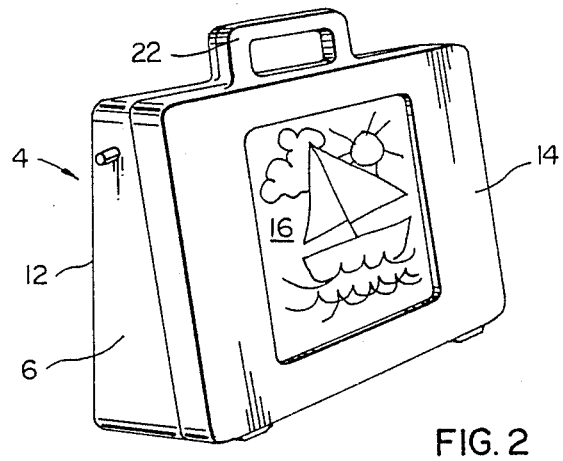
FIG. 2 is a perspective view of the kit of FIG. 1 which its cover closed.

Turning to FIGS. 1 and 2 there is illustrated an example embodiment of an activity kit 2 for children in accordance with the present invention. The kit comprises a case 4 having sides 6, an upper surface 8, a portion of which serves as a drawing surface 10 and a lower surface 12. For ease of drawing, upper surface 8 is downwardly and forwardly sloped with respect to lower surface 12 so that when case 4 is placed on a horizontal surface, drawing surface 10 will be angled towards the user of the kit. A cover 14 is provided for the kit, as illustrated, the cover having an interior storage panel 15 for storage for example of art or stencils, and an exterior window 16 (FIG. 2) which may be used for displaying art created by the user of the kit. Cover 14 is secured by means of hinges 18 to an upper edge of rear side 6 of case 4. Case 4 and its associated cover 14 are provided with appropriate releasable locking means 20 to hold cover 14 closed (as illustrated in FIG. 2) and a handle 22 centrally positioned along the opposite side 6 so that the case may be conveniently carried when the cover is in closed position.

Figure 3:
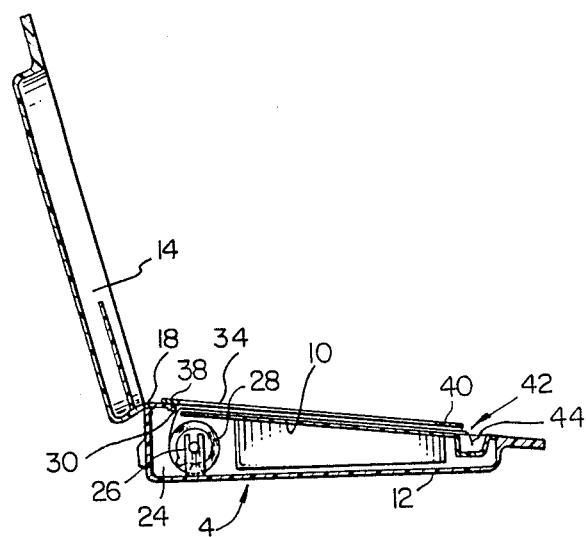
FIG. 3 is a side section view of the kit of FIG. 1 along line III—III of FIG. 1.
Figure 4:
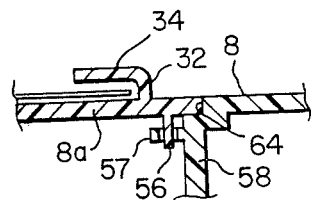
FIG. 4 is an enlarged section view along IV—IV of FIG. 1.

Beneath upper surface 8, within a cavity 24 in case 4 is rotatably secured, on support roll 26 (FIGS. 3 and 5), a paper roll 28 for dispensing of paper from that roll through elongated slot 30 at the rear of drawing surface 10 (FIG. 1). Paper from roll 28 dispensed through slot 30 is guided by side guide shoulders 32 over drawing surface 10. Inwardly extending over a portion of drawing surface 10, spaced above it, are frame flanges 34 secured to guide shoulders 32 (FIG. 4). Extending between opposite frame flanges 34 is a frame flange 38. It is secured to upper surface 8 behind slot 30 and is positioned above drawing surface 10 by means of a shoulder similar to shoulders 32. A lower frame flange 40 extends transversely between frame flanges 34, again spaced above drawing surface 10. In this way, drawing surface 10 is completely framed by frame flanges 34, 38 and 40. Lower frame flange 40 provides, with the lower ends of shoulders 32 and drawing surface 10 an exit slot 42

(FIG. 3) for paper dispensed from roll 28 which is positioned on drawing surface 10. A depression 44 in upper surface 8, adjacent frame flange 38 permits the user to grasp the paper to draw it from paper roll 28 as required. The outer edge 46 of frame flange 40 provides a transverse cutting edge for severing sections of paper which have been drawn from the drawing surface 10.

As can be seen in FIG. 1, case 4 is additionally provided, on its upper surface 8, with an eraser 48 and a sharpener 50 for pencils or the like, seated in corresponding depressions in upper surface 8. Also a pen and pencil/crayon compartment 52 is provided beneath the upper surface 8, with an appropriate cover or lid 54 for opening and closing the compartment 52.

So that the paper roll 28 in cavity 24 may be replaced from time-to-time, as required, a portion of upper surface 8 is removable to provide access to cavity 24. As can be seen in FIG. 4, this removable portion 8a of upper surface 8 is held in position for example by engagement of any appropriate lock means 56 secured to the peripheral undersides of the removable portion 8a and cooperating lock means 57 secured to support walls 58 which support peripheral edges of the removable portion 8a of upper surface 8. As well, the peripheral edges of this removable portion 8a frictionally engage circumscribing cooperating edges of the rest of surface 8, as illustrated. A peripheral seat 64 in support wall 58 further provides support below the peripheral edges of removable portion 8a as illustrated.

Figure 5:
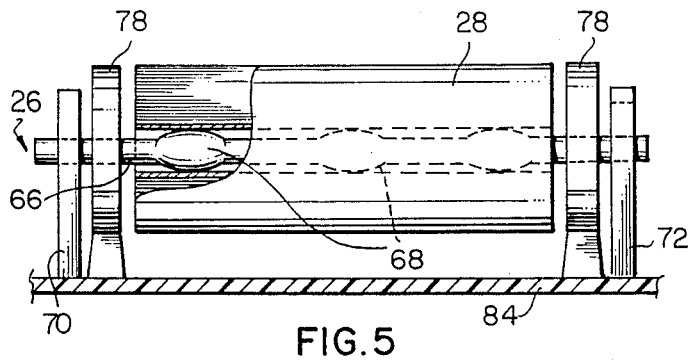
FIGS. 5, 6a and 6b, are respectively side and end views of components of the paperroll dispenser of the present invention.
Figures 6A, 6B:
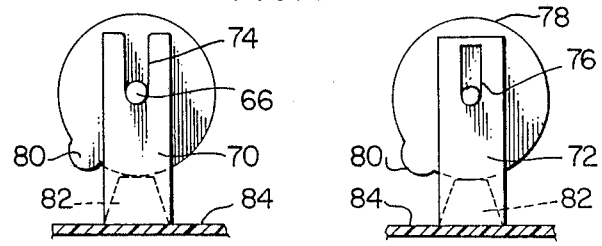

Turning to FIGS. 5 and 6, the construction of support roll 26 for paper roll 28, whereby only a predetermined amount of paper may be normally dispensed at any one time, is illustrated. Support roll 26 comprises a bar 66 having a plurality of spaced protrusions 68 along its length to secure the roll of paper snugly with respect to bar 66. Bar 66 is rotatably supported at its ends by support mounts 70 and 72. As can be seen in FIG. 6, support mount 70 is provided with a slot 74 in which bar 66 is releasably seated for rotative movement. Slot 74 is open at its top while slot 76, on support mount 72 (FIG. 6b) is closed. Both slots 74 and 76 are elongated in the vertical direction to allow bar 66 some room for vertical lift.

On either side of paper roll 28 secured to bar 66 are cam wheels 78, each of which has a circular perimeter except for a similarly positioned cam extension 80, the purpose of which is to ride over an appropriately positioned cam obstruction surface 82 appropriately mounted on floor 84 of case 4 to periodically come into contact with cam extension surfaces 80 as cam wheels 78 rotate. The cam wheel has a circumferential size, and the cam wheel extensions 80 are positioned and constructed so that the cam wheel will permit the normal release of sufficient paper from roll 28, in one pull, so that drawing surface 10 is completely covered by the fresh paper pulled. At that point, cam wheel extensions 80 will be bearing against and riding upon cam obstruction surface 82 so that more strength is needed to continue to draw the paper. The resistance to the drawing of paper thereby caused will force a child to think and realize that the required amount of paper has been drawn and thereby guide that child not to pull all of the paper off the roll at once. As well, cam extension 80 bearing against cam obstruction surface 82 will create sufficient friction and resistance to pulling of further paper to allow tearing of the paper along cutting edge 46. Of course, if additional strength is used in pulling the paper on roll 28, cam extension 80 will clear cam obstruction surface 82, bar 66 lifting in slots 74 and 76 of support mounts 70 and 72, to have cam extension 80 clear cam obstruction surface 82 and free paper roll 28 for continued, normal release of an additional section of paper.

In operation, when it is desired to bring a fresh, section of paper from roll 28 onto the drawing surface 10 between guide shoulders 32 and under frame flanges 34 and 38, one simply pulls the paper on drawing surface 10 by grasping its edge using the depression 44 at slot 42. Sufficient pressure is applied to cause cam extensions to ride over cam obstruction surfaces 82 at the beginning of the pull, and, when resistance is again felt as cam extensions have rotated again to bear against cam obstruction surface 82, sufficient fresh paper to cover the writing surface 10 has been drawn.

Obviously alternative arrangements of mechanisms to permit limited dispensing of paper when required may be adopted by those skilled in the art. The described arrangement is intended to be simple enough for a child to operate, yet sufficiently complex to discourage a young child from a series of repeated dispensing operations over a short period of time, which would of course be wasteful of paper. The advantage of a continuous roll of drawing paper over a pad or the like is obvious, in that a young child does not have the opportunity to use up a large number of sheets of paper at one time, and thereby waste paper. As well, the danger of a continuous roll of drawing paper, in that a young child might be tempted to pull out and unroll the entire roll of paper, is avoided by the paper dispensing control mechanism as described. This allows the child to pull out only one length of paper at a time.

The construction according to the present invention, and in particular elevated frame flanges 34, 38 and 40 circumscribing a major portion of drawing surface 10, lends itself to the use of stencils. The outer edges of such stencils mate with the inner edges of these flanges to permit such a stencil to be readily inserted into position between the frames over drawing surface 10.

Figure 7:
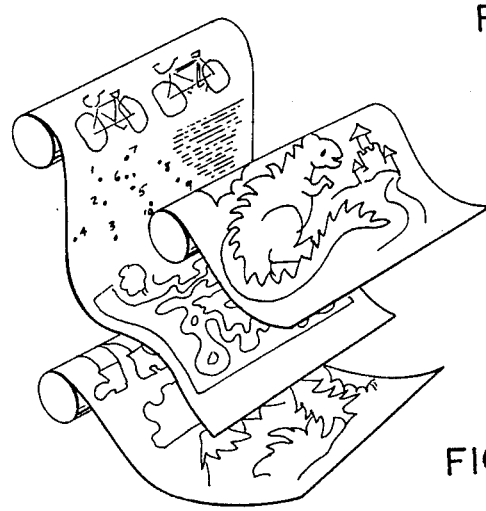
FIG. 7 is a perspective view of example embodiments of paper roll for use in association with the kit of the present invention.

As can be seen in FIG. 7, rolls of paper provided with consecutive sections, each of a size approximating that of the drawing surface, may be provided. Under normal conditions, one activity section on such a roll is presented at a time, the next being hidden from view until the user has completed the activity in the section currently exposed over the drawing surface 10. The possibilities for activities on such rolls are numerous, but it might include dot-to-dot pictures, mazes, pictures to colour, educational exercises and games, word games and puzzles, handwriting instructions and exercises, "how-to-draw" exercises and instructions, crossword puzzles, travel games and puzzles, greeting card design kits, poster design kits, serial story illustrations (frame-by-frame), calligraphy design and instructions. With each new section is a surprise, since, once an old section is completed, a new, previously hidden section appears.

Figure 8:
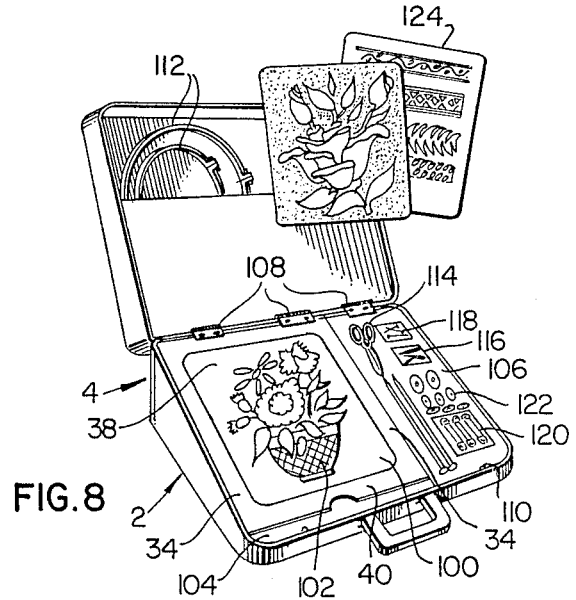
FIG. 8 is a perspective view of another embodiment of the invention, applied to a fabric roll.

In FIG. 8, an alternative embodiment of activity kit 2 in accordance with the present invention is illustrated. This kit is intended for adult needlecraft and, instead of a paper roll, provides a roll of cloth 100 within cavity 24, cloth being dispensed through the elongated slot onto activity surface 104 between frame flanges 34, 38 and 40. Activity surface 104, and indeed the entire table surface 106 of the device is preferably removably hinged at hinges 108 to case 4 and secured in position with respect to the sides of case 4, for example by means of releasable locking pins 110. In this manner, an alternative table surface may replace table surface 106, for example to provide alternative or different activities. In the illustrated embodiment, stretching hoops 112, scissors 114, needles 116, pins 118, safety pins 120, buttons 122 and patterns 124 may be provided. In this particular illustrated embodiment, it is also preferable that activity surface 104 be raisable with respect to the remainder of table surface 106, so that the person sewing can have access to the lower surface of the cloth.

Using this same concept, different types of sewing and pattern kits from those of cloth may be provided, such as a doll cloth or fabric fashion designer kit.

Similarly, with respect to paper or cloth rolls, stencils may be provided to provide tracings on the paper or fabric for clothing and accessories which may be then cut out and secured to a basic doll pattern.

Thus it is apparent that there has been provided in accordance with the invention an activity kit that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An activity kit comprising:
   (a) a rigid case having sides circumscribing an upper surface and a lower surface, the upper surface providing a flat activity surface, the activity surface having means releasably locking it in position in the rigid case whereby the activity surface is removable and replaceable with another activity surface to permit adopting of the kit to a different activity;
   (b) a cavity within the case for receiving a roll of activity medium on which the activity is to be carried out;
   (c) an elongated slot in the upper surface communicating with the cavity through which slot medium from the roll is to be dispensed onto the activity surface, the length of the slot being sufficient to permit unobstructed dispensing of medium from the roll through it;
   (d) medium guide means positioned on the upper surface adjacent the slot at the ends thereof and extending normal thereto in the direction of dispensing of the medium to guide and position medium from the slot over the activity surface;
   (e) medium dispensing control means to restrict the amount of medium which can be dispensed at one time to only so much as is needed to cover the activity surface; and
   (f) a cover cooperating with the sides of the case to cover and protect the upper surface when the activity kit is not in use.

2. A drawing kit according to claim 1 wherein the medium is paper.

3. A kit according to claim 2 wherein the paper dispensing control means comprises a support bar on which the paper roll is to be mounted for simultaneous rotation with the support bar, and cam means mounted on the support bar for rotation therewith, and a cam obstruction surface mounted on the case within the cavity so that the rotation of the cam means is interrupted by the cam obstruction surface to prevent normal rotation of the support bar when sufficient paper has been dispensed from the paper roll to cover the activity surface.

4. A kit according to claim 2 wherein paper guide means circumscribe the activity surface and are elevated above it to form a frame beneath which paper from the roll is to be positioned on the activity surface.

5. A kit according to claim 4 further provided with stencil means to be seated, during use, within the frame and having edges which engage circumscribing edges of the frame to prevent movement of the stencil means during use.

6. A kit according to claim 4 wherein the frame is of rectangular shape with a first guide means near and parallel to the slot and a second guide means opposite to the first guide means to form, with the upper surface a slot for passage of paper from beneath the frame off of the activity surface, these first and second guide means being positioned in a direction normal to the direction of dispensing of paper from the roll.

7. A kit according to claim 6 wherein a depression is provided in the upper surface of the case outside the frame beside the slot formed by the second guide means and the upper surface, to facilitate gripping of paper for dispensing paper from the roll.

8. A kit according to claim 7 wherein a cutting edge is provided on the second guide means, transverse to the direction of dispensing of the paper, to permit tearing of sections of paper.

9. A kit according to claim 2 further provided with an opening in the upper surface beside the activity surface, the opening communicating to a pen and pencil receiving cavity, and a cover to close the opening as required operatively associated with the upper surface.

10. A kit according to claim 2 further provided with an eraser means.

11. A kit according to claim 2 further provided with a pencil sharpener means.

12. A kit according to claim 2 wherein the cover is hinged to one of the sides of the case and mates with releasable locking means at the opposite side of the case when in closed position.

13. A kit according to claim 12 wherein transparent windows are provided on the outside of the cover for display of drawings.

14. A kit according to claim 2 further provided with a handle means for carrying the case when the cover is in closed position.

15. A kit according to claim 2 wherein the upper surface is angled forwardly and downwardly with respect to the bottom surface.

16. A kit according to claim 2 further provided with a roll of paper rotatably secured within the cavity so that paper to be dispensed may be fed through the slot onto the activity surrface.

17. A kit according to claim 2 further provided with a roll of paper rotatably secured within the cavity so that paper to be dispensed may be fed through the slot onto the activity surface.

18. A kit according to claim 17 wherein the paper of the roll is pre-printed with sections of a size corresponding to that of the activity surface and having a variety of colouring or writing activities for children printed on the sections.

19. A kit according to claim 1 wherein the medium is cloth.

* * * * *